(12) United States Patent
Kelly et al.

(10) Patent No.: US 8,349,214 B1
(45) Date of Patent: Jan. 8, 2013

(54) SYNTHESIS GAS METHOD AND APPARATUS

(75) Inventors: Sean M. Kelly, Pittsford, NY (US);
Brian R. Kromer, Buffalo, NY (US);
Michael M. Litwin, Cheektowaga, NY (US); Lee J. Rosen, Buffalo, NY (US);
Gervase Maxwell Christie, Amherst, NY (US); Jamie R. Wilson, Maynard, MA (US); Lawrence W. Kosowski, Colden, NY (US); Charles Robinson, Lawtons, NY (US)

(73) Assignee: Praxair Technology, Inc., Danbury, CT (US)

( * ) Notice: Subject to any disclaimer, the term of this patent is extended or adjusted under 35 U.S.C. 154(b) by 68 days.

(21) Appl. No.: 13/179,279

(22) Filed: Jul. 8, 2011

(51) Int. Cl.
*C01B 3/38* (2006.01)
*C01B 3/26* (2006.01)
(52) U.S. Cl. .................................. 252/373; 423/652
(58) Field of Classification Search ............. 252/373
See application file for complete search history.

(56) References Cited

U.S. PATENT DOCUMENTS

| | | | |
|---|---|---|---|
| 6,048,472 A | 4/2000 | Nataraj et al. | |
| 6,110,979 A | 8/2000 | Nataraj et al. | |
| 6,114,400 A | 9/2000 | Nataraj et al. | |
| 6,296,686 B1 | 10/2001 | Prasad et al. | |
| 6,402,988 B1 | 6/2002 | Gottzmann et al. | |
| 6,695,983 B2 * | 2/2004 | Prasad et al. | 252/373 |
| 6,783,750 B2 * | 8/2004 | Shah et al. | 423/652 |
| 7,427,368 B2 * | 9/2008 | Drnevich | 252/373 |
| 2006/0029539 A1 | 2/2006 | Dutta et al. | |
| 2007/0029342 A1 | 2/2007 | Cross et al. | |
| 2007/0041894 A1 | 2/2007 | Drnevich | |
| 2007/0065687 A1 | 3/2007 | Kelly et al. | |
| 2008/0302013 A1 | 12/2008 | Repasky et al. | |

* cited by examiner

*Primary Examiner* — Melvin C Mayes
*Assistant Examiner* — Kenneth Vaden
(74) *Attorney, Agent, or Firm* — David M. Rosenblum

(57) ABSTRACT

A method and apparatus for producing a synthesis gas product having one or more oxygen transport membrane elements thermally coupled to one or more catalytic reactors such that heat generated from the oxygen transport membrane element supplies endothermic heating requirements for steam methane reforming reactions occurring within the catalytic reactor through radiation and convention heat transfer. A hydrogen containing stream containing no more than 20 percent methane is combusted within the oxygen transport membrane element to produce the heat and a heated combustion product stream. The heated combustion product stream is combined with a reactant stream to form a combined stream that is subjected to the reforming within the catalytic reactor. The apparatus may include modules in which tubular membrane elements surround a central reactor tube.

10 Claims, 10 Drawing Sheets

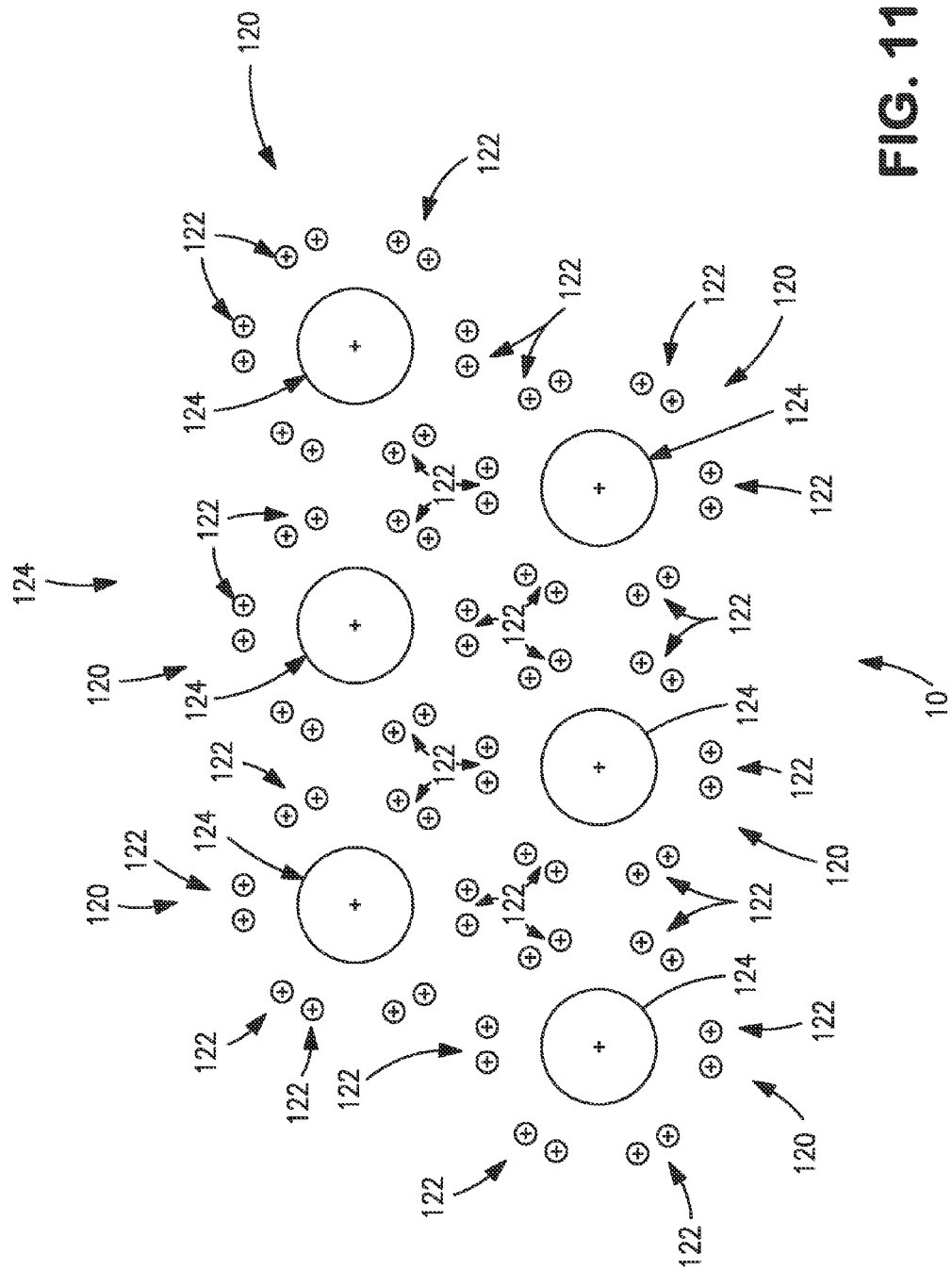

US 8,349,214 B1

SYNTHESIS GAS METHOD AND APPARATUS

This invention was made with Government support under Cooperative Agreement No. DE-FC26-07NT43088, awarded by the United States Department of Energy. The Government has certain rights in this invention.

FIELD OF THE INVENTION

The present invention provides a method and apparatus for producing a synthesis gas product in which a hydrogen containing stream composed of a synthesis gas containing no more than 20 percent by volume methane is reacted with oxygen permeating through an oxygen transport membrane to generate heat to heat the membrane and support endothermic heating requirements of steam methane reforming reactions conducted in a separate catalytic reactor designed to produce the synthesis gas product.

BACKGROUND OF THE INVENTION

Synthesis gas containing hydrogen and carbon monoxide is produced for a variety of industrial applications, for example, the production of hydrogen, chemicals and synthetic fuel production. Conventionally, the synthesis gas is produced in a fired reformer in which natural gas and steam is reformed to the synthesis gas in catalyst filled reformer tubes. The endothermic heating requirements for steam methane reforming reactions occurring within the reformer tubes are provided by burners firing into the furnace that are fueled by part of the natural gas. In order to increase the hydrogen content of the synthesis gas, the synthesis gas can be subjected to water-gas shift reactions to react residual steam in the synthesis gas with the carbon monoxide.

Such steam methane reformers are optimized for hydrogen production and typically are fed with a reactant stream containing hydrocarbons and steam at a steam-to-carbon ratio of 1.5 to 3.5, depending on the quantity of carbon dioxide in the reactant stream, to thereby produce the synthesis gas at a hydrogen to carbon monoxide ratio of 3 or higher. This is not optimal for the production of synthesis gas for synthetic fuel production such as in Fisher-Tropsch or methanol synthesis where a hydrogen to carbon monoxide ratio of 1.8 to 2.0 within the synthesis gas is more desirable. Consequently, where synthetic fuel production is a desired use of the synthesis gas, an autothermal reformer is typically used in which the steam-to-carbon ratio of the reactant is typically between 0.5 and 0.6. In such a reactor, oxygen is used to combust part of the feed to create additional steam and heat to reform the hydrocarbons contained in the feed to the synthesis gas. As such, for a large scale installation, an air separation plant may be required to supply the oxygen.

As can be appreciated, conventional methods of producing a synthesis gas such as have been discussed above are expensive and complex installations. In order to overcome the complexity and expense of such installations it has been proposed to generate the synthesis gas within reactors that utilize an oxygen transport membrane to supply oxygen and thereby generate the heat necessary to support endothermic heating requirements of the steam methane reforming reactions. A typical oxygen transport membrane has a dense layer that, while being impervious to air or other oxygen containing gas, will transport oxygen ions when subjected to an elevated operational temperature and a difference in oxygen partial pressure across the membrane. This difference in oxygen partial pressure can be produced by compressing the supplied air or from combustion of hydrocarbons fed to a permeate side of the membrane and supported by permeated oxygen or a combination of the two methods.

For example, in U.S. Pat. No. 6,048,472 and U.S. Pat. No. 6,110,979, a reactant gas feed is combined with steam. The reactant gas feed can be natural gas, naphtha or other hydrocarbon containing gas. This combined feed stream is then heated and introduced into an adiabatic pre-reformer to produce an intermediate stream that contains carbon monoxide, carbon dioxide, steam, hydrogen, and methane. The intermediate stream can be combined with carbon dioxide and steam. The resulting reactant stream is then introduced with air into reactant and oxidant sides, respectively, of an oxygen transport membrane reformer. The oxygen transport membrane reformer has an oxygen transport membrane separating the reactant and oxidant sides of the reformer. The reactant gas reacts with oxygen that has permeated through the oxygen transport membrane to produce a synthesis gas. Preferably a reforming catalyst is applied to at least a portion of the reactant side surface of oxygen transport membrane or packed into the reactant side to promote the reforming reactions. U.S. Pat. No. 6,114,400 discloses an integrated system in which an oxygen transport membrane reformer is connected to a downstream reactor such as a Fischer-Tropsch reactor to produce a liquid product. In all of these patents the presence of the pre-reforming stage will prevent the breakdown of higher order hydrocarbons present in the reactant feed stream and the resulting carbon deposition that would otherwise occur had the higher order hydrocarbons been fed directly to the reactor. Such carbon deposition will degrade reforming catalyst used in connection with the oxygen transport membrane reactor.

U.S. Pat. No. 6,296,686 discloses a reactor in which heat is supplied to an endothermic reforming reaction inside a reaction passage separated from an air passage by an oxygen transport membrane. A reactant gas, for example, methane flows through the reaction passage is combusted with permeated oxygen to provide the heat to support the reforming reaction. Further heat is supplied to the reforming reaction by either combusting a fuel with retentate or a fuel with a second permeate produced by another oxygen transport membrane or within a combustion passage. Alternatively, an oxygen transport membrane can be situated between an air passage and a combustion passage and a barrier is located between the combustion passage and the reaction passage. In such case, the oxygen transport membrane supplies oxygen permeate to support combustion of a fuel in the combustion passage and thereby generate heat that is transferred to the reaction passage.

US Patent Appln. No. 2008/0302013 discloses a staged reactor system having a sequential arrangement of reactor stages to produce a synthesis gas product. Each of the reactor stages has an oxidant side separated from a reactant side by an oxygen transport membrane. The reactant sides are linked together so that a reactant stream containing methane and steam is introduced into the system and sequentially reacted with oxygen permeating through the membrane to produce a synthesis gas product for use in a downstream reactor such as a Fischer-Tropsch reactor. Catalyst beds can be located within the reactant side of the reactor stages or can be positioned between the reactor stages. Both steam and a reactant gas from a downstream process utilizing the synthesis gas can be introduced into the feed between stages. The presence of the multiple stages allows the temperature within each of the reaction stages to be controlled to prevent the oxygen transport membrane from being degraded and to control the deposition of soot throughout the membrane system. US Patent Appln. No. 2006/0029539 discloses other examples of staged reactor systems that can employ oxygen transport membranes in which the air or other oxygen containing stream fed to each of the stages can be controlled to control the temperatures and conversation that can be obtained in producing a synthesis gas.

The problem with all of these systems is that an oxygen transport membrane will operate at high temperatures of about 900° C. to 1100° C. Where hydrocarbons such as methane and also higher order hydrocarbons are subjected to such temperatures carbon formation will occur. Additionally, where oxygen is supplied by an oxygen transport membrane, the area of the membrane is distributed throughout the reactor. As such, the oxygen is not generally available at the entrance to the reactor. This also results in an aggravated carbon formation problem at the entrance that is especially the case at low steam-to-carbon ratios. In any case, a reactant containing methane and steam will produce a relatively low oxygen flux across the membrane resulting in the membrane area required for such a reactor to be larger and it will add to the expense and complexity in such a reactor. Additionally, a steam methane reforming catalyst must be periodically replaced. In prior art reactor designs where the catalyst is employed adjacent to the oxygen transport membrane, catalyst replacement becomes an expensive if not impractical exercise.

The present invention, in one or more aspects, provides a method and apparatus in which the oxygen transport membrane is not directly used to react the steam and methane components of the reactant feed, but rather, to generate the heat required to support endothermic heating requirements of steam methane reforming reactions within a separate reactor.

SUMMARY OF THE INVENTION

The present invention provides, in one aspect, a method for producing a synthesis gas product. In accordance with such method, permeate and retentate sides of at least one oxygen transport membrane element, configured to separate oxygen through oxygen ion transport, are contacted with a hydrogen containing stream formed from a synthesis gas containing no more than 20 percent methane by volume, hydrogen and an oxygen containing stream, respectively. The hydrogen containing stream is reacted with the oxygen transported through the at least one oxygen transport membrane element, thereby generating heat, a heated reaction product stream, and a heated retentate stream. The heated reaction product stream is combined with a reactant stream to form a combined stream comprising hydrocarbons contributed by the reactant stream and steam contributed at least by the heated reaction product stream. The hydrocarbons and steam contained in the combined stream are reacted in at least one catalytic reactor to produce a synthesis gas stream. Heat generated by the at least one oxygen transport membrane element to the at least one catalytic reactor by radiation from the at least one oxygen transport membrane element and by indirect heat transfer from the heated retentate stream to the at least one catalytic reactor to assist in supporting endothermic heating requirements of the steam methane reforming reaction. The synthesis gas product is produced from at least part of the synthesis gas stream.

Unlike the prior art, the oxygen transport membrane is used to generate heat and potentially steam for the steam methane reforming and such heat is transferred to a separate catalytic reactor. A major advantage in such an arrangement is that the combustion of synthesis gas with permeated oxygen is a far more rapid reaction than methane or methane and higher order hydrocarbons. In the prior art, generally a pre-reformed stream that would be mostly methane and steam is combusted at the permeate side of an oxygen transport membrane that also contains a catalyst to promote steam methane reforming reactions. Consequently, a reactive system in accordance with the present invention may use far less oxygen transport membrane area than a prior art reactor. This translates into a reactive system in accordance with the present invention that is less complex and expensive than prior art systems and further, is less susceptible to failure. Additionally, since the catalytic reactor is a separate unit, the catalyst can more easily be replaced than in a prior art system in which the catalyst is incorporated into an oxygen transport membrane element.

A supplementary steam stream can be introduced into at least one of the hydrogen containing stream and the reactant stream. A carbon dioxide stream can be introduced into at least one of the heated reaction product stream, the reactant stream, the hydrogen containing stream and the combined stream to obtain some dry-reforming within the catalytic reactor. The oxygen containing stream can be preheated through indirect heat exchange with the heated retentate stream prior to being introduced to the retentate side of the at least one oxygen transport membrane. The synthesis gas stream can be divided such that the synthesis gas product is formed from part of the synthesis gas stream and the hydrogen containing stream is formed from another part of the synthesis gas stream that is recycled to the permeate side of the at least one oxygen transport membrane element.

A supplementary steam stream can be introduced into at least one of the hydrogen containing stream and the reactant stream. The at least one catalytic reactor can have a polishing section heated by an auxiliary burner fired by a fuel thereby increasing the equilibrium temperature at the outlet of the at least one catalytic reactor and reducing methane slip from such reactor or reactors. The heated retentate supports combustion of the fuel within the auxiliary burner prior to preheating the oxygen containing stream.

The synthesis gas stream can be cooled at least in part by adding water or steam into the synthesis gas stream prior to dividing the synthesis gas stream.

The at least one catalytic reactor can be at least one first catalytic reactor. The hydrogen containing stream is formed, at least in part, by reacting additional hydrocarbons and the further steam in the at least one second catalytic reactor. The heat can also be transferred to the second catalytic reactor by radiation and indirect heat transfer from the heated retentate stream to supply the endothermic heating requirements for the reaction of the additional hydrocarbons and further steam.

In another aspect, the present invention provides an apparatus for producing a synthesis gas product. Such apparatus comprises at least one oxygen transport membrane element configured to separate oxygen from the oxygen containing stream contacting a retentate side of the at least one oxygen transport membrane element and to combust a hydrogen containing stream formed of a synthesis gas containing no more than 20 percent methane at a permeate side of the at least one oxygen transport membrane element in the presence of permeated oxygen. This combustion generates heat, a heated reaction product stream and a heated retentate stream.

The at least one catalytic reactor is configured to react the hydrocarbons and steam to produce a synthesis gas stream and thereby to, at least in part, produce the synthesis gas product. The at least one catalytic reactor is connected to the at least one oxygen transport membrane element such that the heated reaction product stream is combined with a reactant stream containing the hydrocarbons to form a combined stream comprising the hydrocarbons contributed by the reactant stream and steam contributed at least by the heated reaction product stream that is introduced into the at least one catalytic reactor. The at least one oxygen transport membrane element and the at least one catalytic reactor are positioned with respect to one another within an elongated insulated housing such that the heat is radiated from the at least one oxygen transport membrane element to the at least one catalytic reactor and is indirectly transferred from the heated retentate stream to the at least one catalytic reactor to assist in supporting endothermic heating requirements of the steam methane reforming reaction.

The at least one oxygen separation element can also be in flow communication with the at least one catalytic reactor such that the synthesis gas product is formed from a first part of the synthesis gas stream and the hydrogen containing stream is formed from a second part of the synthesis gas stream. A means is provided for cooling the synthesis gas stream and for recycling the second part of the synthesis gas stream to the permeate side of the at least one oxygen transport membrane element.

The cooling and recycling means can comprise a convective heat exchange network and a flow network. The convective heat exchange network has a series of heat exchangers in flow communication with the at least one catalytic reactor. These heat exchangers are configured to cool the synthesis gas stream through indirect heat exchange with: the second part of the synthesis gas stream; the reactant stream; a hydrocarbon containing stream containing the hydrocarbons; boiler feed water, thereby to raise superheated steam and a quench steam stream; and cooling water. The flow network is associated with the convective heat exchange network to introduce the quench steam stream into the synthesis gas stream prior to the series of heat exchangers, to introduce at least part of the superheated steam into the hydrocarbon containing stream after having been heated, thereby to form the reactant stream and to divide the synthesis gas stream after having indirectly exchanged heat with the hydrocarbon containing stream and the boiler feed water into the first and the second part of the synthesis gas stream. Also included is a recycle blower connected to the flow network to recycle the second part of the synthesis gas stream to the permeate side of the at least one oxygen transport membrane and a knockout drum connected to the convective heat exchange network to remove condensate from the synthesis gas stream after having been cooled, thereby to produce the synthesis gas product.

A heat exchanger can be connected to the oxygen separation device and configured such that the oxygen containing stream is preheated through indirect heat exchange with the heated retentate stream prior to being introduced to the retentate side of the at least one oxygen transport membrane element. The at least one catalytic reactor can have a polishing section situated within a duct that contains a burner fired by a fuel thereby increasing the equilibrium temperature at the outlet of the at least one catalytic reactor and reducing methane slip from such reactor or reactors. The duct burner is positioned between the oxygen separation device and the heat exchanger such that the heated retentate supports combustion of the fuel within the duct burner prior to preheating the oxygen containing stream within the heat exchanger.

In a specific embodiment of the present invention, the at least one catalytic reactor is at least one first catalytic reactor and at least one second catalytic reactor is provided that is configured to react additional hydrocarbons contained in a subsidiary reactant stream with further steam, thereby producing a subsidiary synthesis gas stream. The permeate side of the at least one oxygen transport membrane element is connected to the at least one second catalytic reactor such that the hydrogen containing stream is formed, at least in part, from the subsidiary synthesis gas stream. The at least one second catalytic reactor is positioned such that heat generated by the at least one oxygen transport membrane element is also transferred by radiation and through indirect heat transfer from the heated retentate stream to the at least one second catalytic reactor to assist in supporting endothermic heating requirements of the steam methane reforming reaction.

The at least one oxygen transport membrane element can be of tubular configuration and the permeate and retentate sides can be located on inner and outer surfaces of the at least one oxygen transport membrane element. The elongated, insulated reactor housing having opposed openings is situated at opposite ends houses the oxygen separation device and the at least one catalytic reactor such that the oxygen containing stream is introduced into one of the opposed openings and the heated retentate stream is discharged from the other of the opposed openings. The at least one catalytic reactor faces the at least one oxygen transport membrane element such that the heat is radiated to the at least one catalytic reactor and the oxygen containing stream contacts the retentate side of the at least one oxygen transport membrane and thereafter, the heated retentate stream contacts the at least one catalytic reactor to transfer heat from the heated retentate stream before being discharged from the other of the opposed openings. In an embodiment of the present invention where there is at least one second catalytic reactor, the at least one second catalytic reactor is positioned downstream of the at least one first catalytic reactor and also faces the at least one oxygen transport membrane element such that the heat is radiated to both the at least one first catalytic reactor and the at least one second catalytic reactor. Also, the oxygen containing stream contacts the retentate side of the at least one oxygen transport membrane element and thereafter, the heated retentate stream contact the at least one catalytic reactor and the at least one second catalytic reactor to also transfer the heat from the heated retentate stream to the at least one second catalytic reactor before being discharged from the other of the opposed openings.

In any embodiment of the present invention the at least one oxygen transport membrane element can be formed by a plurality of oxygen transport membrane tubes and the at least one catalytic reactor can be formed by reactor tubes containing a catalyst to promote the steam methane reforming reaction and having inlets at one end of each of the reactor tubes and outlets at the other end of the reactor tubes to discharge the synthesis gas stream. The plurality of oxygen transport membrane tubes and the reactor tubes can be contained within modules. In one preferred embodiment the modules have the plurality of oxygen transport membrane tubes positioned so as to surround the central reactor tubes. Inlet manifolds are connected to the oxygen transport membrane tubes to introduce the hydrogen containing stream into the oxygen transport membrane tubes and outlet manifolds are connected to the oxygen transport membrane tubes to receive the heated combustion product stream. The outlet manifolds are connected to the inlets of the central reactor tubes such that the heated combustion product stream is combined with a hydrocarbon containing stream, thereby to form a combined stream to undergo the steam methane reforming reaction. The modules are arranged such that a view factor between each of the central reformer tubes and the oxygen transport membrane tubes radiating heat to each of the central reformer tubes is greater than or equal to 0.5

In yet another aspect, the present invention provides a reactor module. The reactor module has a central reactor tube containing a catalyst to promote a steam methane reforming reaction and having at one end an inlet and at the other end an outlet to discharge a reformed stream. A plurality of oxygen transport membrane tubes surround the central reactor tube and are configured to separate oxygen from an oxygen containing feed and to generate heat for supporting endothermic heating requirements of the steam methane reforming reaction. An inlet manifold is connected to the oxygen transport membrane tubes to introduce a hydrogen containing feed into the oxygen transport membrane tubes for combustion of the hydrogen containing feed supported by oxygen permeating through the oxygen transport membrane tubes and generation of a heated combustion product stream and the heat. An outlet manifold is connected to the oxygen transport membrane tubes to receive the heated combustion product stream and the outlet manifold is connected to the inlet of the central reactor tube such that the heated combustion product stream is combined with a hydrocarbon containing stream, thereby to form a combined stream to undergo the steam methane reforming reaction. A means is provided for feeding the hydrogen containing stream to the inlet manifold and for feeding the hydrocarbon containing stream to the inlet of the central reactor tube.

Each of the oxygen transport membrane tubes can have an inlet section and an outlet section connected to the inlet section and parallel thereto such that the hydrogen containing stream enters the inlet section and the heated combustion product stream is discharged from the outlet section. The inlet manifold and the outlet manifold comprises a plate-like element having inlet openings to receive the hydrogen containing stream and a radial arrangement of inlet passages in registry with the inlet openings to feed the hydrogen containing stream to the inlet passages. Bores defined in the plate-like element communicate between the inlet sections and the inlet passages to feed the hydrogen containing stream to the inlet sections and communicate between the outlet sections and the outlet passages to feed the heated combustion product stream from the outlet section to the outlet passages. Outlet openings communicate between the outlet passages and the inlet of the central reactor tube to feed the heated combustion product stream to the inlet of the central reactor tube.

The feeding means can comprise an inlet assembly. The inlet assembly comprises an inlet plenum in communication with the inlet openings and an outer feed tube connected to the inlet plenum to feed the hydrogen containing stream into the inlet plenum and into the inlet openings. An inner feed tube is coaxially positioned within the outer feed tube and extends through the inlet plenum to the inlet of the central reactor tube. The inlet of the central reactor tube can be a mixing section positioned between one end of the inner feed tube and the catalyst. The plate-like element can include a first plate and a second plate connected to the first plate in a juxtaposed relationship. The first plate is connected to the inlet sections and the outlet sections of the oxygen transport membrane tubes and the central reactor tube and has a radial arrangement of grooves to form the inlet passages and the outlet passages. The bores are in communication with the inlet passages and the outlet passages. The outlet openings are in registry with a portion of the radial arrangement of the grooves forming the outlet openings. The inner feed tube passes through the first plate and the second plate to the inlet of the central reactor tube and the first plate has the inlet openings. The inlet openings are positioned so as to be in registry with the a remaining portion of the radial arrangement of the grooves that form the inlet passages and the inlet plenum is connected to the first plate and encloses the inlet openings.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which:

FIG. 11 is a schematic, sectional illustration of an arrangement of reactor modules shown in FIG. 6 employed in an elongated insulated reactor housing shown in FIG. 3.

For the sake of avoiding repetition, common elements in the various Figures utilize the same numbers where the explanation of such elements would not change from Figure to Figure.

DETAILED DESCRIPTION

Figure 1:
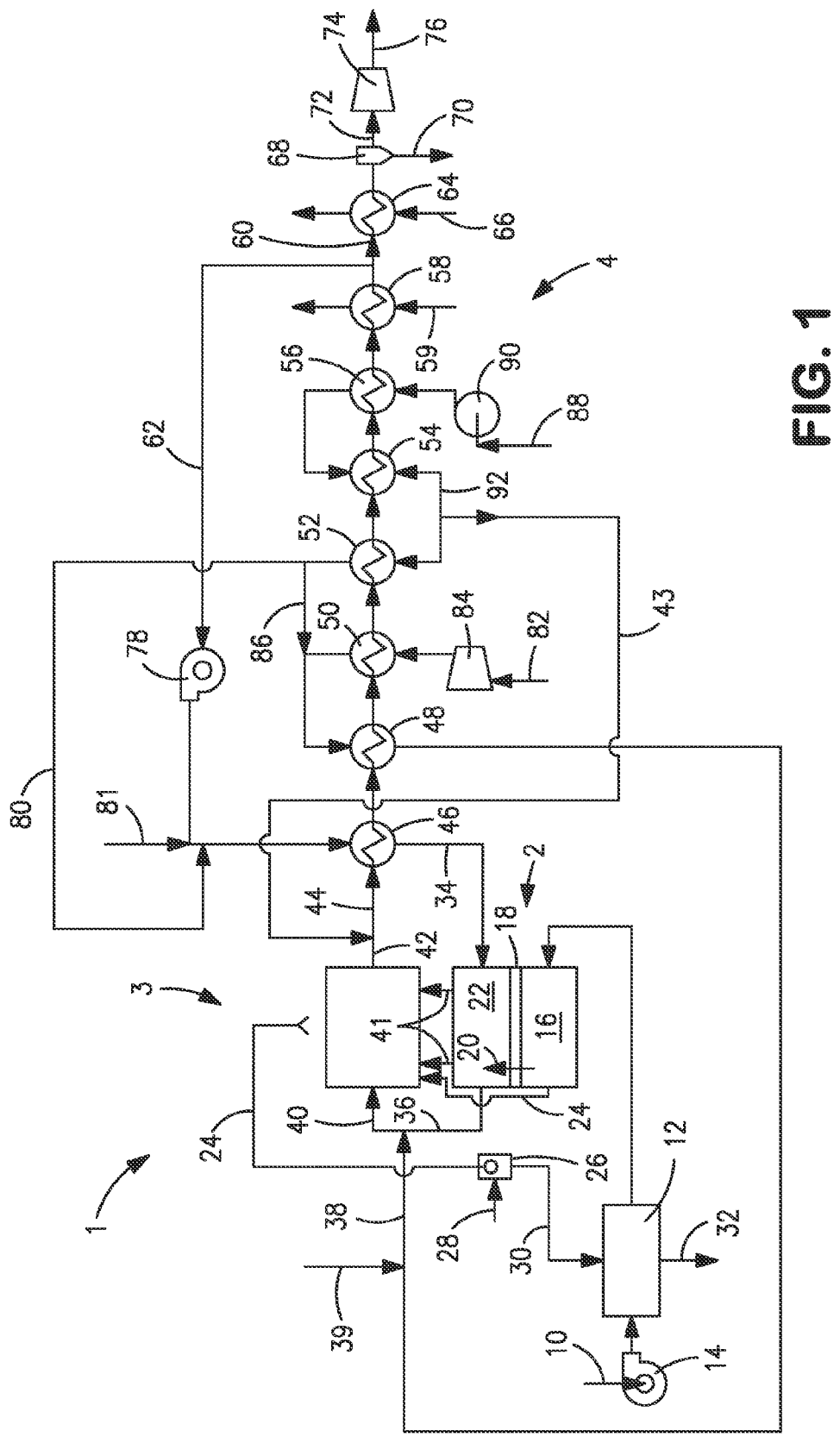
FIG. 1 is a schematic illustration of an apparatus designed to carry out a method in accordance with the present invention.

With reference to FIG. 1, an apparatus 1 is illustrated that is designed to produce a synthesis gas product through the steam methane reforming of hydrocarbons. Apparatus 1 includes one or more oxygen transport membrane elements of which oxygen transport membrane element 2 is illustrated. Oxygen transport membrane element 2 supplies heat by radiation and convective heat transfer to supply the endothermic heating requirements of a catalytic reactor 3 within which the hydrocarbons and steam are reacted to produce a synthesis gas. As well known in the art, at high temperatures, from 700 to 1100° C., steam will react with methane to yield a synthesis gas that contains hydrogen and carbon monoxide. Catalytic reactor 3, as would be known in the art, contains a catalyst, typically nickel, to promote such steam methane reforming reaction. Additionally, water-gas shift reactions occur in which the carbon monoxide will react with the steam to produce carbon dioxide and hydrogen. Although the water-gas shift reaction is exothermic, the steam methane reforming reaction is endothermic and requires heat to be supplied to the catalytic reactor. Carbon dioxide will also react with methane in so-called dry reforming reactions to also produce the synthesis gas. In this regard, carbon dioxide can be added for such purpose. The resulting synthesis gas is a mixture of hydrogen, carbon monoxide, carbon dioxide and water and other known constituents such as unreacted methane known in the art as methane slip. The synthesis gas is optionally cooled and compressed within a convective section 4 to produce the synthesis gas product and a recycle stream that is fed back to the oxygen transport membrane device 2 for combustion with permeated oxygen to generate the necessary heat.

As is apparent from the above discussion, apparatus 1 functions in an analogous manner to an autothermal reformer in which oxygen is added to the reactant to partially oxidize some of the hydrocarbons contained in the reactant to generate the heat to support the overall endothermic heating requirements for the steam methane reformer. This being said, the combustion occurring within the oxygen transport membrane device 2 will typically be at least 50 percent complete so that there is virtually no molecular oxygen that will be left over to react with the hydrocarbons because otherwise sufficient heat will not be generated by the oxygen transport membrane device 2 to support endothermic heating requirements required for the steam methane reforming reactions occurring within the catalytic reactor 3. A further point to be mentioned, is that if an operation were attempted within apparatus 1 in which the hydrocarbons contained within reactant were combusted within the oxygen transport membrane device 2, such a reaction will typically be so slow that it is impractical if not impossible to generate the heat required for subsequent endothermic steam methane reforming because the hydrocarbons will not react to an appreciable extent within an oxygen transport membrane. The present invention takes advantage of the fact that oxidation of hydrogen and carbon monoxide is a particularly rapid reaction that part of the synthesis gas generated from the catalytic reactor can be used to generate heat while still allowing for a reasonable production rate of the synthesis gas product from apparatus 1.

More specifically, an oxygen containing stream 10 can be introduced by means of a blower 14 into a heat exchanger 12 for purposes of preheating the oxygen containing stream 10. Heat exchanger 12 could be a convective type heat exchanger or a high efficiency, cyclic regenerative type heat exchanger. Oxygen containing stream 10 can be ambient air or possibly a stream bled from a compressor section of a gas turbine. In the latter case, blower 14 and heat exchanger 12 might not be necessary. It is to be noted that no compression of the oxygen containing stream 10 is required or even desired. The blower 14 is provided to simply motivate the oxygen containing stream 10 through apparatus 1 against pressure drops produced by piping and the like. The heated oxygen containing stream 10 is then contacted with the retentate side 16 of oxygen transport membrane element 18 incorporated into the oxygen transport membrane device 2. Although one such oxygen transport membrane element 18 is illustrated, as would occur to those skilled in the art, there could be many of such elements in an industrial application of the present invention and the oxygen transport membrane device 2 could be oxygen transport membrane tubes 122 incorporated into a module 120 to be discussed hereinafter. As will also be discussed, the oxygen transport membrane element 18 is formed of a ceramic capable of conducting oxygen ions at an elevated operational temperature. The oxygen ions permeate through the oxygen transport membrane element 18 in the direction of arrowhead 20 to the permeate side 22 of the oxygen transport membrane element 18.

As a result of the separation of the oxygen and combustion occurring at the permeate side 22 of oxygen transport membrane element 18, a heated retentate stream 24 is formed that, after transferring heat to catalytic reactor 3, can optionally can be introduced into a duct burner 26 and used to support combustion of a fuel stream 28 to produce a heated flue gas stream 30 that is introduced into the heat exchanger 12 for purposes of preheating the oxygen containing stream 10 through indirect heat exchange. The resulting cooled flue gas stream 32 is discharged from heat exchanger 12. Although not illustrated, if necessary, supplemental air can be injected into duct burner 26 to support combustion. It is to be noted that embodiments are possible in which duct burner 26 is not used and the retentate stream is directly introduced into the heat exchanger 12 for purposes of pre-heating the oxygen containing stream 10. In this regard, oxygen containing stream 10 could contact retentate side 16 of oxygen transport membrane 18 at ambient temperature and without preheating. However, this would not be thermally efficient.

A hydrogen containing stream 34 is introduced into the permeate side 22 of the oxygen transport membrane element 18 that is oxidized though combustion of permeated oxygen to produce a heated combustion product stream 36. The heated combustion product stream 36 is combined with a reactant stream 38 to produce a combined stream 40 that contains steam and hydrocarbons that is introduced into the catalytic reactor 3 where such stream is subjected to steam methane reforming reactions to produce a synthesis gas stream 42. It is to be noted that embodiments of the present invention are possible in which the reactant stream only contains hydrocarbons such as methane and lower order alkanes and the steam is contributed solely by the heat combustion product stream. As will be discussed, however, it is preferable, however, that steam be added to both the reactant stream 38, the heated combustion product stream 42 and the hydrogen containing stream 34. Further, as illustrated, a carbon dioxide stream 39 may optionally be added to the reactant stream 38 or the combined stream 40 or the heated combustion product stream 36 or possibly the hydrogen containing stream 34 as a stream 81, upstream of heat exchanger 46 for purposes of enhancing dry reforming occurring within catalytic reactor 3.

The combustion of the hydrogen containing stream 34 produces heat that through radiation as generally indicted by arrowheads 41 which together with the convective heat transfer provided by heated retentate stream 24 contacting the catalytic reactor 3, heats the catalytic reactor 3 to at least assist in supplying endothermic heating requirements of the steam methane reforming reactions occurring in catalytic reactor 3. If necessary, endothermic heating requirements can also be supplied through indirect heating with the use of auxiliary burners combusting part of the reactant stream 38 and firing at the catalytic reactor 3.

Synthesis gas stream 42 contains hydrogen, carbon monoxide, steam and carbon dioxide and as discussed above, other components such as possible methane slip. Convective section 4 is designed to cool the synthesis gas stream 42 and recycle part of the synthesis gas stream to form the hydrogen containing stream 34. Practically, it is necessary to cool the synthesis gas stream 42 before recycling such stream in a recycle blower 78. Convective section 4 is also designed such that in cooling the synthesis gas stream, various feed streams are preheated and process steam is generated.

In the cooling of synthesis gas stream 42, a steam stream 43 is combined within the synthesis gas stream 42 to produce a quenched synthesis gas stream 44. Alternatively, water could also be added to synthesis gas stream 42 to add steam to the process and also increase the temperature reduction due to the latent heat of vaporization for the added water. This step is important not only to cool the synthesis gas stream 42, but also to prevent coking of the synthesis gas upon cool down.

The quenched synthesis gas stream 44 is successively further cooled in a convective heat exchange network that includes heat exchangers 46, 48, 50, 52, 54 and 56 and water cooled heat exchangers 58 and 64. The quenched synthesis gas stream 44 after having been cooled in water cooled heat exchanger 58 by a cooling water stream 59, is divided into a first part 60 and a second part 62. First part 60 is further cooled within the water cooled heat exchanger 64 by cooling water stream 66 and the resulting stream is introduced into a knock-out drum 68 from which a condensate stream 70 is drained to produce a cooled synthesis gas stream 72. Cooled synthesis gas stream 72 is optionally compressed in a compressor 74 to produce a synthesis gas product stream 76 that forms the synthesis gas product. The second part 62 is recirculated back to the permeate side 22 of the oxygen transport membrane element 18 by means of a recirculation blower 78. Optionally, a first supplementary steam stream 80 is added to the second part 62 to form the hydrogen containing stream 34 that is preheated within heat exchanger 46 through indirect heat exchange with the quenched synthesis gas stream 44.

A hydrocarbon containing stream 82, that can be natural gas and more preferably, natural gas that has been pre-reformed in an adiabatic pre-reformer, is compressed in a feed compressor 84 and then preheated in heat exchanger 50 that serves as a fuel preheater. It is to be mentioned that where natural gas is used, it will typically contain unacceptably high level of sulfur species. While there are sulfur tolerant catalysts that can be used in catalytic reactor 3, in most cases the natural gas would have to be hydrotreated to remove the sulfur content. Further, since natural gas contains alkenes that will break down at high temperature to form carbon that can deactivate the catalyst, the steam to carbon ratio of the stream entering catalytic reactor 3 would have to be carefully controlled to prevent coking of the catalyst. In this regard, other possible hydrocarbon containing feeds include associated gas, LPG, naphtha. The resulting heated stream can be combined with a second supplementary steam stream 86 to form the reactant stream 38 that is further heated in heat exchanger 48 through indirect heat exchange with the quenched synthesis gas stream 44 after having passed through heat exchanger 46. The first and second supplementary steam streams 80 and 86 are formed by pumping a boiler feed water stream 88 in a feed water pump 90 and then passing the pressurized stream through heat exchanger 56 that acts as a boiler feed water heater and then through heat exchanger 54 that serves as a boiler to create saturated steam and finally through a heat exchanger 52 that serves as a super heater to produce a superheated steam stream. One portion of the saturated steam stream 92 forms steam stream 43 and the other portion passes through heat exchanger 52 and is superheated and then, subsequently divided into the first and second supplementary steams streams 80 and 86.

As can be appreciated, in possible applications of the present invention, convective section 4 may not be present where the synthesis gas is desired at high temperature. Further, convective section 4 could be simplified by providing appropriate means to cool the synthesis gas before recycling part of the same back to the permeate side 22 of the oxygen transport membrane. For example, the use of water cooled heat exchangers alone or preferably in combination with steam stream 43 or other quench stream.

Figure 2:
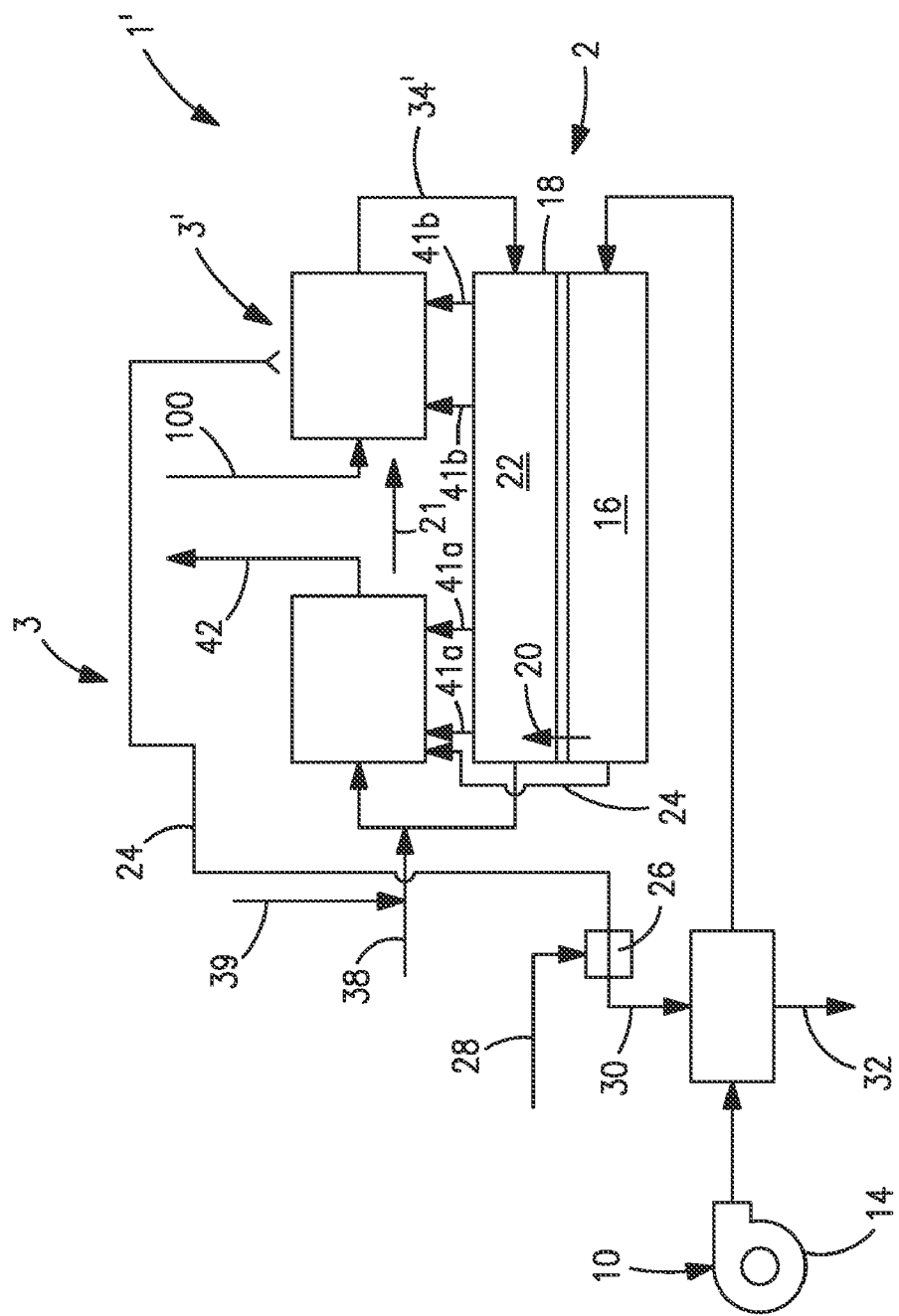
FIG. 2 is a schematic illustration of an alternative embodiment of an apparatus designed to carry out a method in accordance with the present invention.

With reference to FIG. 2, an alternative embodiment of the apparatus shown in FIG. 1 is indicated as apparatus 1'. In apparatus 1', a hydrogen containing stream 34' is produced by reacting a subsidiary reactant stream 100 in a reactor 3'. Subsidiary reactant stream could be a stream containing steam and fuel in a higher net steam-to-carbon ratio than the reactant stream 38 fed into catalytic reactor 3. Reactor 3' would be a catalytic reactor designed to react the hydrocarbons and steam to a sufficient extent that the hydrogen containing stream 34' is a synthesis gas that contains methane present in an amount of no greater than 20 percent by volume. For example, the fuel could be pre-reformed natural gas having a methane content of 80% or greater, that is reacted with steam to reduce the methane content to below 20 percent by volume. Reactor 3' could be thermally integrated with the oxygen transport membrane element 2 and as such, heat is radiated from the oxygen transport membrane element 2 to both the reactor 3 and the reactor 3' as indicated by arrowheads 41a and 41b, respectively. Further, convective heat transfer occurs through indirect heat transfer produced by contact of the heated retentate stream 24 with both the catalytic reactor 3 and 3'. However, embodiments of the present invention are possible in which reactor 3' are not be thermally integrated with reactor 3. Synthesis gas stream 42 can then be further processed in convective system 4 or potentially could be used in a process that required the synthesis gas stream 42 at high temperature. In most cases, however, a water stream or steam stream 43 would be introduced into synthesis gas stream 42 for purposes of lowering the temperature of such stream. Additionally, it is also possible to integrate the apparatus 1' with recirculation of part of the synthesis gas produced by reactor 3 by the use, for example, of a convective system such as convective system 4. It is also to be noted that where there exists a suitable hydrogen containing stream 34', such as a hydrogen product stream from a conventional steam methane reformer, the same could be introduced into the permeate side 22 of an oxygen transport membrane element 2 without the use of reactor 3' and subsidiary reactant stream 3'. However, as indicated above, the hydrogen containing stream 34 or 34' or any hydrogen containing stream used for such purpose is a synthesis gas that has been sufficiently processed so as to contain no more than 20 percent methane by volume. Any increase in methane beyond this point is disadvantageous because it does not react at high rates relative to hydrogen and carbon-monoxide, and this will generally result in reduced overall oxygen transport. Additionally, issues with coking may be present.

As has been discussed above, the hydrogen to carbon ratio of the synthesis gas product produced by apparatus 1 or apparatus 1' for that matter, is the central object of the control for of such apparatus. For instance, a hydrogen to carbon ratio of about 2.0 in the synthesis gas product is required for direct integration with a Fisher-Tropsch gas to liquid plant. There are 3 control handles that will affect the hydrogen-to-carbon ratio of the process and apparatus as has been discussed above. Assuming fixed carbon input and hydrogen input from fuel, input steam, input oxygen, and input carbon (not in fuel) can be adjusted to in turn control the hydrogen-to-carbon ratio in the synthesis gas product. Steam may be added anywhere in either apparatus 1 or 1'. This steam provides additional hydrogen to the process and thus, minimizing steam reduces hydrogen to carbon ratio of the synthesis gas product. Oxygen is input through steam, carbon dioxide and as molecules transferred across the oxygen transport membrane 18. Oxygen input from these sources, excepting steam, will generally reduce hydrogen-to-carbon monoxide ratio of the synthesis gas product. Hydrogen input is from steam and hydrogen contained in the reactant stream 38. Decreasing steam and decreasing hydrogen-to-carbon ratio of the fuel (increasing carbon content) will reduce hydrogen-to carbon monoxide ratio of the synthesis gas product.

The process design incorporated into apparatus 1 or 1' allows the steam input to be reduced while maintaining margin on coke formation within the process. If carbon content can be increased in the reactant stream 38, then hydrogen-to-carbon monoxide may be reduced further. The reactant stream 38, as discussed above, is generally comprised of steam and pre-reformed natural gas. A carbon containing gas stream, for instance, stream 39, may be combined with the reactant stream 38 to reduce hydrogen-to-carbon ratio of the reactant stream 38. Carbon dioxide input at the reactant stream is particularly valuable in reducing the hydrogen to carbon ratio in the synthesis gas product. Stream 39 may be a carbon dioxide rich tail gas generated from the process, or can be recycled, or a carbon-dioxide rich gas imported from a nearby process. Having said this, however, the present invention is equally applicable where hydrogen is the desired product and therefore, the hydrogen to carbon ratio is optimized for such purpose.

Figure 3:
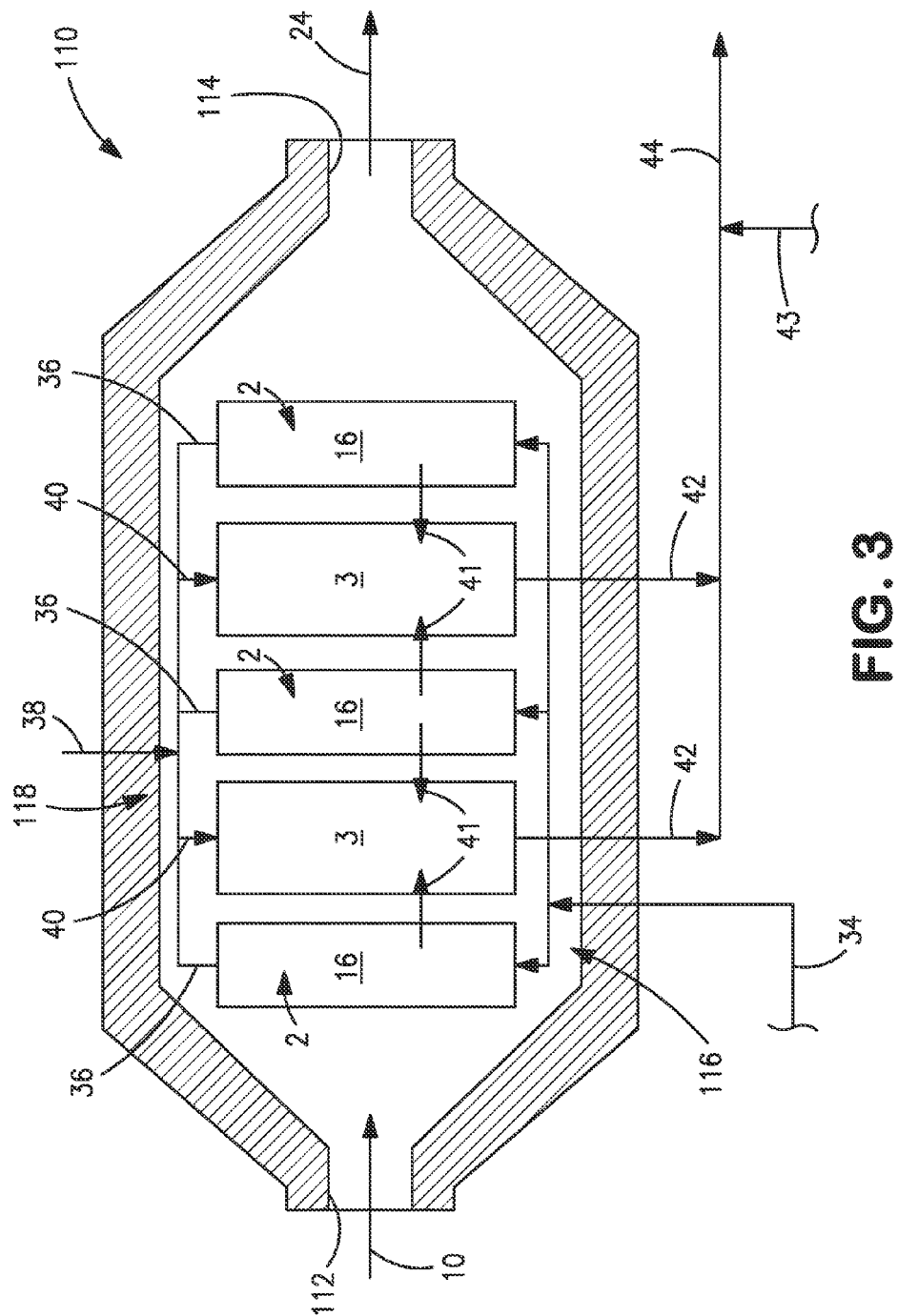
FIG. 3 is a fragmentary, schematic illustration of the apparatus of FIG. 1 showing an arrangement of oxygen transport membranes and catalytic reactors within an elongated, insulated housing.

With reference again to FIG. 1 and with additional reference to FIG. 3, the thermal integration of oxygen transport membrane element 2 and reactor 3 can be accomplished in an elongated insulated reactor housing 110 that is provided with opposed openings 112 and 114 provided within opposite ends thereof. Elongated insulated reactor housing 110 houses the oxygen transport membrane element 2 and the catalytic reactor 3 so that they face one another for purposes of radiation heat transfer and also to allow the heated retentate stream 24 to contact the catalytic reactor 3. A manifold 116 is provided for introduction of hydrogen containing stream 34 into the permeate sides 22 of the oxygen transport membrane elements 2. A manifold 118 is provided for combining the heated combustion product stream 36 from the permeate side 22 with the reactant stream 38 and thereby form the combined stream 40 for introduction into the catalytic reactors 3. In FIG. 3, although three such oxygen transport membrane elements 2 and reactors 3 are illustrated, as mentioned above, there could be many more of such elements and reactors depending upon the industrial need. However, preferably, the oxygen transport membrane elements 2 are all in the form of a tube in which the permeate side 22 is located inside the tube and the retentate side 16 is the outer surface of the tube. As will be discussed, such tubes can be of cylindrical form, although hollow plate-like elements are possible.

Although it is possible to conduct a process in accordance with the present invention in which the retentate and permeate sides of the oxygen transport membrane elements are reversed, this would be disadvantageous in that it would be very difficult to completely combust the synthesis gas and would require that the elongated insulated reactor housing 110 to be a pressure vessel. Further, it is also possible to conduct a process of the present invention in which the oxygen containing stream 10 was compressed to provide part of the driving force for the oxygen separation. This would not be desirable because it would also require the elongated insulated reactor housing 110 to be a pressure vessel. In this regard, the illustrated elongated insulated reactor housing 110 is designed to operate at atmospheric pressure and as such, is not a pressure vessel.

In this illustrated embodiment, the oxygen containing stream 10 is introduced into opening 112 and the heated retentate stream is discharged from opening 114. In operation, the oxygen containing stream 10 contacts the retentate side 16 of the oxygen transport membrane elements 2 and becomes successively lean in oxygen as oxygen permeates to the permeate side 22 of such elements. As the hydrogen containing stream 34 reacts with the permeated oxygen, the resulting retentate stream becomes successively heated to indirectly transfer the heat generated by the oxygen transport membrane elements to the catalytic reactors 3. At the same time, the oxygen transport membrane elements 2 also radiate heat to also supply heat to the catalytic reactors 3. In fact, such radiation preferably constitutes approximately 80 percent of the heat transferred. Thus, the heat transferred as indicated by arrowheads 41 from the oxygen transport membrane elements 2 to the catalytic reactors 3 is accomplished by both radiation and convection. While, there is also some heat transferred directly, through the mixing of the heated combustion product stream 36 with reactant stream 38, this heat transfer is much less than the radiation and convective heat transfer discussed above. In fact, its importance will be negligible in the illustrated embodiment given the preheating of the reactant stream 38.

Figure 4:
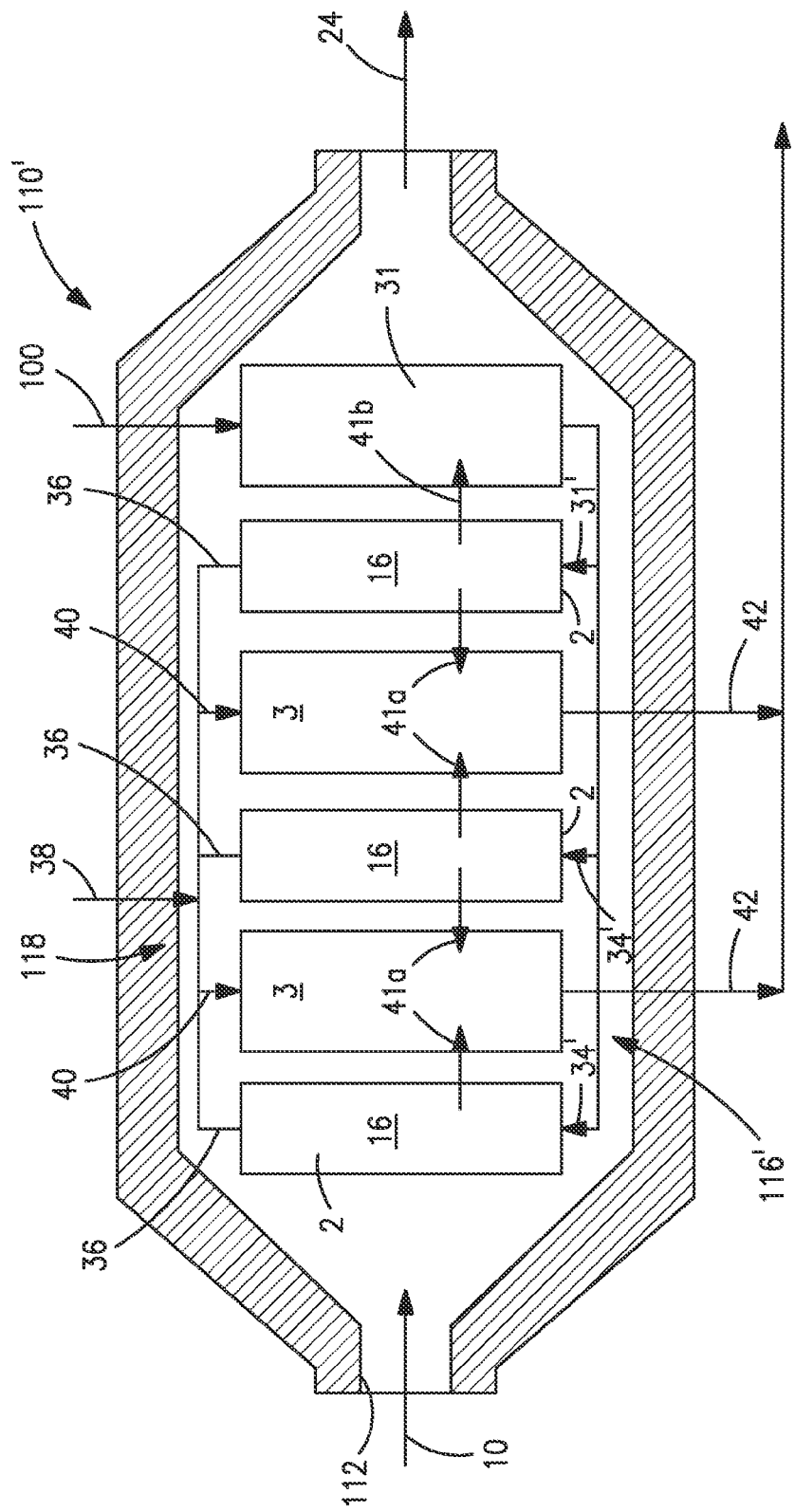
FIG. 4 is a fragmentary, schematic illustration of the apparatus of FIG. 2 showing an arrangement of oxygen transport membranes and catalytic reactors within an elongated, insulated housing.

With reference again to FIG. 2 and with additional reference to FIG. 4, the integration of catalytic reactors 3 and 3' and oxygen transport membrane elements 2 is illustrated in an elongated insulated reactor housing 110' that functions in much the same manner as elongated insulted reactor housing 110. The major difference is that at least one of the catalytic reactors 3 has been replaced by a catalytic reactor 3' that is connected to the oxygen transport membrane elements 2 by an manifold 116' for introduction of the hydrogen containing stream 34' into the permeate side 22 thereof. The catalytic reactor 3' is positioned so as also to be heated by radiation heat transfer as shown by arrowhead 42b from at least one of the oxygen transport membrane elements 16 and also, to be heated through indirect heat transfer from the heated retentate after the heated retentate has heated the catalytic reactors 3.

Figure 5:
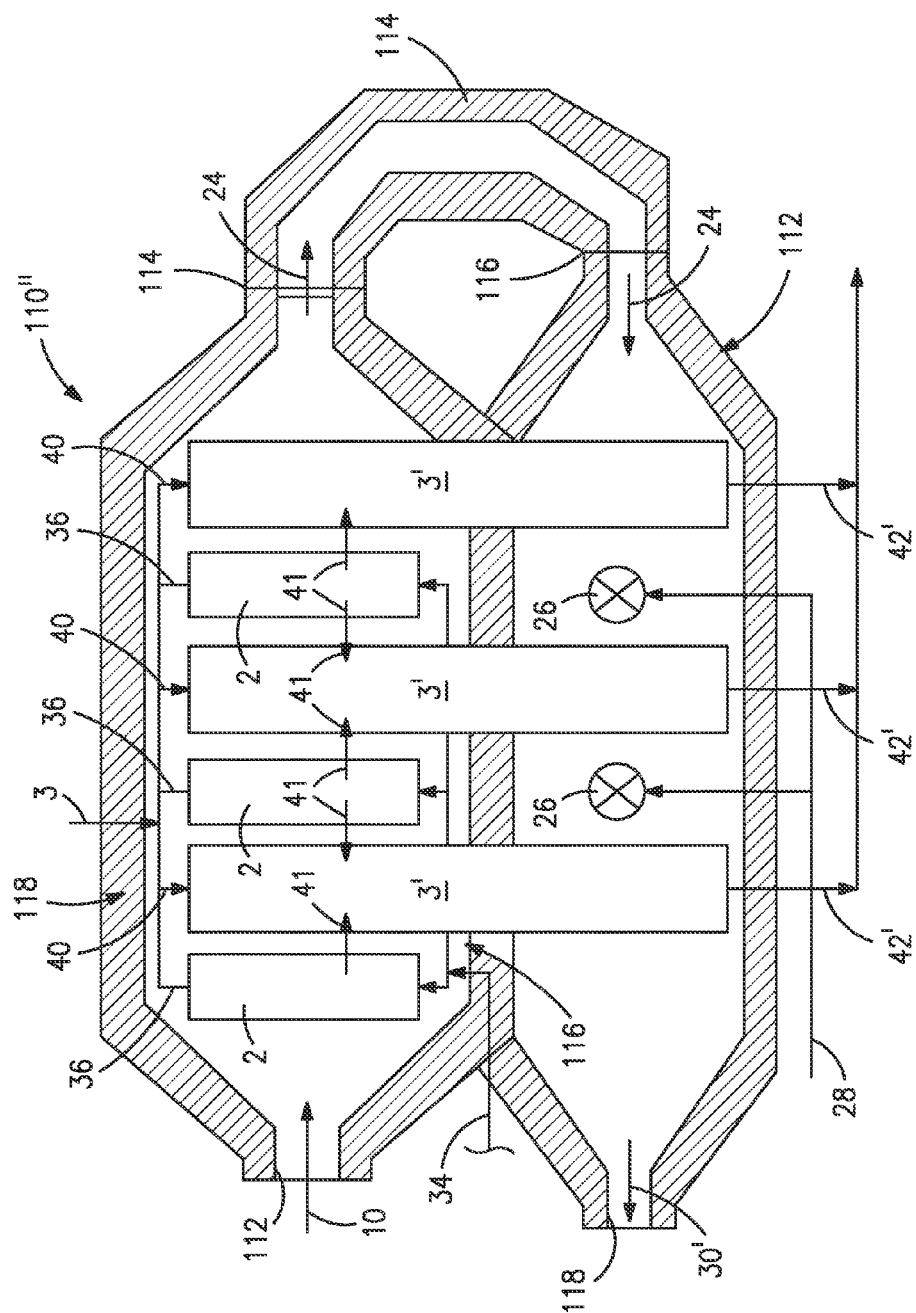
FIG. 5 is an alternative embodiment of FIG. 3.

With reference to FIG. 5, an elongated insulated reactor housing 110" is illustrated that is connected to a duct burner housing 112 by means of an insulated transfer section 114. Elongated, insulated reactor housing 110" functions in the same manner as elongated insulated reactor housing 110. In this regard, the oxygen transport membrane elements 2 transfer heat by radiation and conduction to catalytic reactors 3'. As is apparent, however, catalytic reactors 3' are longer than catalytic reactors 3 and the lengthened sections of such reactors extend into duct burner housing 112 and serve as polishing sections to subject methane slip occurring within the catalytic reactors 3' to steam methane reforming. In this regard, the duct burner housing 112 has an inlet 116 and an outlet 118 situated opposite to the inlet 116. The heated retentate stream 24, by means of transfer section 114, is introduced into inlet 116 to support combustion of fuel stream 28 introduced into duct burners 26 that are situated within duct burner housing 112. Fuel stream 28 may, as necessary, contain supplementary air to the extent necessary to support combustion. The resultant heat produced by such combustion will support endothermic heating requirements of the steam methane reforming reactions of the methane slip within the extended sections of catalytic reactors 3' projecting into duct burner housing 112. The resulting heated flue gas stream 30' is discharged from the outlet 118 and the same may be introduced into heat exchanger 12 for purposes of preheating the oxygen containing stream 10 as has been described above in connection with FIG. 1. The resulting synthesis gas stream 42' will contain hydrogen, carbon monoxide, steam and carbon dioxide, but will have a lower concentration of methane than synthesis gas stream 42. Synthesis gas stream 42' can be quenched to produce quenched synthesis gas stream 44 and the same can be processed within convective system 4 in a manner as has been described above.

In the embodiments of the present invention illustrated in FIGS. 3, 4 and 5 the oxygen transport membrane elements alternate with the catalytic reactors 3 or 3'. As can be appreciated, there could be many of such elements depending on the required output of the synthesis gas to be produced by apparatus 1. This being said, it is important that the positioning of the oxygen transport membrane elements 2 with respect to the catalytic reactors 3 be optimized for radiation heat transfer purposes. In other words, from a radiation heat transfer aspect, the catalytic reactors 3 must be in "view" of the oxygen transport membrane elements 2. At the same time, practically, for purposes of reliability and construction costs, it is also necessary to minimize the number of oxygen transport membrane elements 2.

Figure 6:
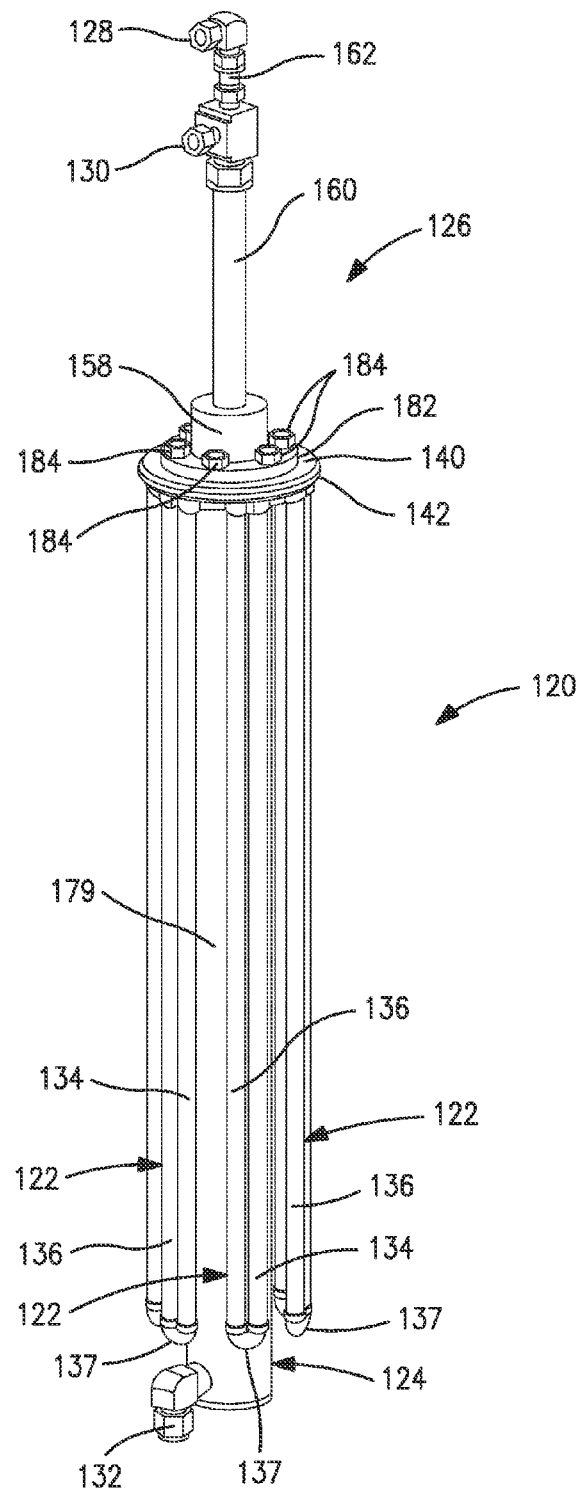
FIG. 6 is a perspective view of a module in accordance with the present invention that incorporates oxygen transport membrane tubes and a central reactor tube in an advantageous heat transfer integration.

With reference to FIG. 6, such optimization, as has been discussed above, can be effectuated by arranging the oxygen transport membrane element 2 and the catalytic reactors 3 in modules such as the illustrated reactor module 120. In reactor module 120, the oxygen transport membrane element 2 is formed by a plurality of oxygen transport membrane tubes 122 that surround a central reactor tube 124 that contains a catalyst to promote the steam methane reforming reaction and thus forms the catalytic reactor 3. A feed assembly 126 has an inlet 128 for the heated reactant stream 38; and as will be discussed, is designed to mix such stream with the heated combustion product stream produced by oxygen transport membrane tubes 122 and thereby form the combined stream 40. If several of such reactor modules 120 were used, the manifold 118 shown in FIG. 3, for example, would in part be incorporated into such structure with an additional manifold to distribute reactant stream 38 to the inlet 128 of each feed assembly 126. Additionally, an inlet 130 is provided for introducing the hydrogen containing stream 34 into the permeate side of the oxygen transport membrane tubes 122. Again, in case of several reactor modules 120, the manifold 116 would be connected to each inlet 130 of each of the reactor modules 120. Further, the oxygen transport membrane tubes 122 have the permeate side 22 within the tubes and the exterior of such tubes serve as the retentate side 16. The synthesis gas stream 42 is discharged from an outlet 132 to the reactor tube 124. As illustrated inlet 128 and inlet 130 can be formed of conventional gas-tight couplings that are attached to an outer feed tube 160 and an inner feed tube 162 to be discussed hereinafter, in a gas-tight threaded engagement known in the art.

The oxygen transport membrane tubes 122 preferably incorporates a composite structure that incorporates a dense layer, a porous support and an intermediate porous layer located between the dense layer and the porous support. Each of the dense layer and the intermediate porous layer are capable of conducting oxygen ions and electrons at an elevated operational temperature to separate the oxygen. The porous support layer would thus form the permeate side 22. The dense layer and the intermediate porous layer comprises a mixture of an ionic conductive material and an electrically conductive material to conduct oxygen ions and electrons, respectively. The ionic conductive material is composed of a fluorite. The intermediate porous layer has a lower permeability and a smaller average pore size than the porous support layer to distribute the oxygen separated by the dense layer towards the porous support layer. Catalyst particles or a solution containing precursors of the catalyst particles are located in the intermediate porous layer and in the porous support adjacent to the intermediate porous layer. The catalyst particles contain a catalyst selected to promote oxidation of the hydrogen containing stream 34 in the presence of the oxygen when introduced into the pores of the porous support, on a side thereof opposite to the intermediate porous layer.

The catalyst can be gadolinium doped ceria. Further, a porous surface exchange layer can be provided in contact with the dense layer opposite to the intermediate porous layer. In such case, the porous surface exchange layer would form the retentate side 16. The support layer is preferably formed from a fluorite, for example 3 mol % yttria stabilized zirconia, or 3YSZ.

In a specific embodiment, the intermediate porous layer can have a thickness of between about 10 microns and about 40 microns, a porosity of between about 25 percent and about 40 percent and an average pore diameter of between about 0.5 microns and about 3 microns. The dense layer can have a thickness of between about 10 microns and about 30 microns. The porous surface exchange layer can be provided with a thickness of between about 10 microns and about 40 microns, a porosity of between about 30 percent and about 60 percent and a pore diameter of between about 1 microns and about 4 microns and the support layer can have a thickness of between about 0.5 mm and about 10.0 mm, but preferably 0.9 mm and a pore size no greater than 50 microns. The intermediate porous layer can contain a mixture of about 60 percent by weight of $(La_{0.825}Sr_{0.175})_{0.96}Cr_{0.76}Fe_{0.225}V_{0.015}O_{3-\delta}$, remainder 10Sc1YSZ, the dense layer can be formed of a mixture of about 40 percent by weight of $(La_{0.825}Sr_{0.175})_{0.94}Cr_{0.72}Mn_{0.26}V_{0.02}O_{3-x}$, remainder 10Sc1YSZ and the porous surface exchange layer can be formed by a mixture of about 50 percent by weight of $(La_{0.8}Sr_{0.2})_{0.98}MnO_{3-\delta}$, remainder 10Sc1CeSZ.

Figure 7:
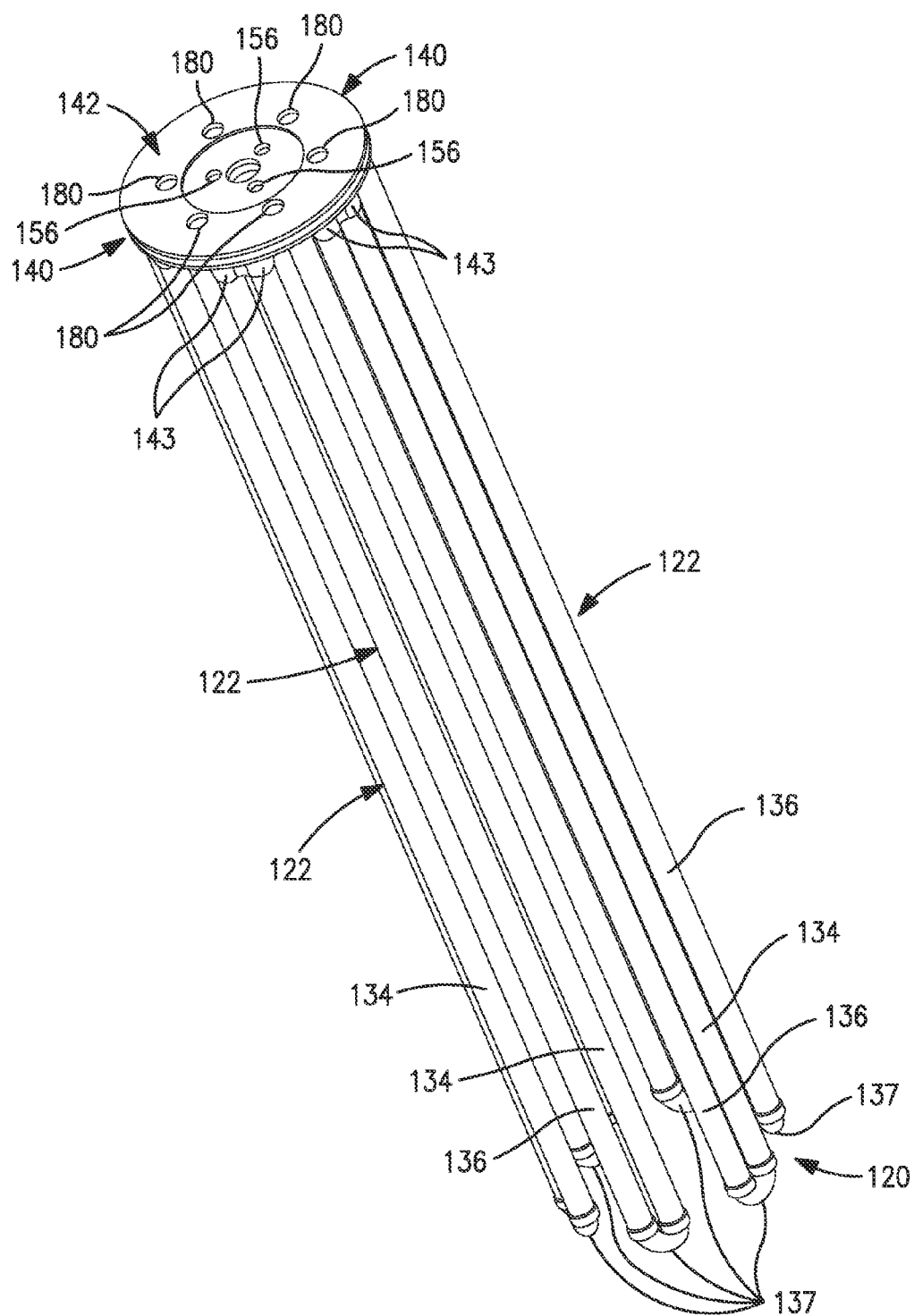
FIG. 7 is a perspective view of a sub-assembly of oxygen transport membranes used in the module shown in FIG. 6.

With reference to FIG. 7, each of the oxygen transport membrane tubes 122 consists of an inlet section 134 into which the hydrogen containing stream 34 is introduced and an outlet section 136 from which the heated combustion product stream is discharged. It is understood that reaction with the permeated oxygen and the hydrogen containing stream 34 occurs within both the inlet section 134 and the outlet section 136. The inlet and outlet sections 134 and 136 are parallel to one another and the central reactor tube 124 and are connected to one another by "U" shaped pipe-like bends 137 that are formed from dense ceramic material like YSZ or MgO—MgAl2O4. The oxygen transport membrane tubes 122 are connected to a plate-like element 138 that, in a manner that will be discussed, serves as an inlet manifold to introduce the hydrogen containing stream into the inlet section 134 and an outlet manifold to collect the heat combustion product stream 36 and introduce such stream along with the reactant stream 38 into the central reactor tube 124.

Figure 8:
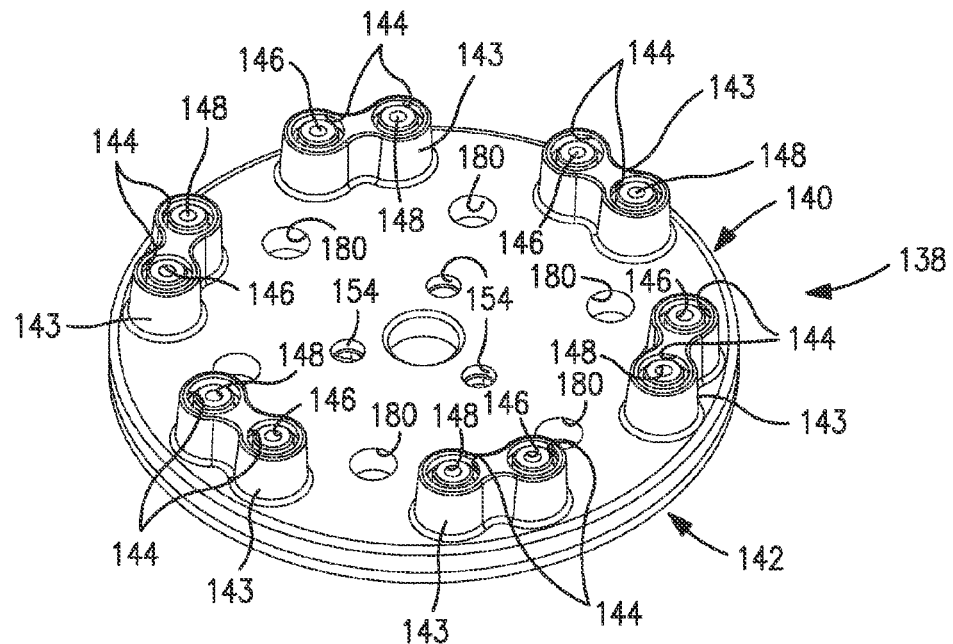
FIG. 8 is a bottom perspective view of a plate-like element utilized in the module shown in FIG. 6.
Figure 9:
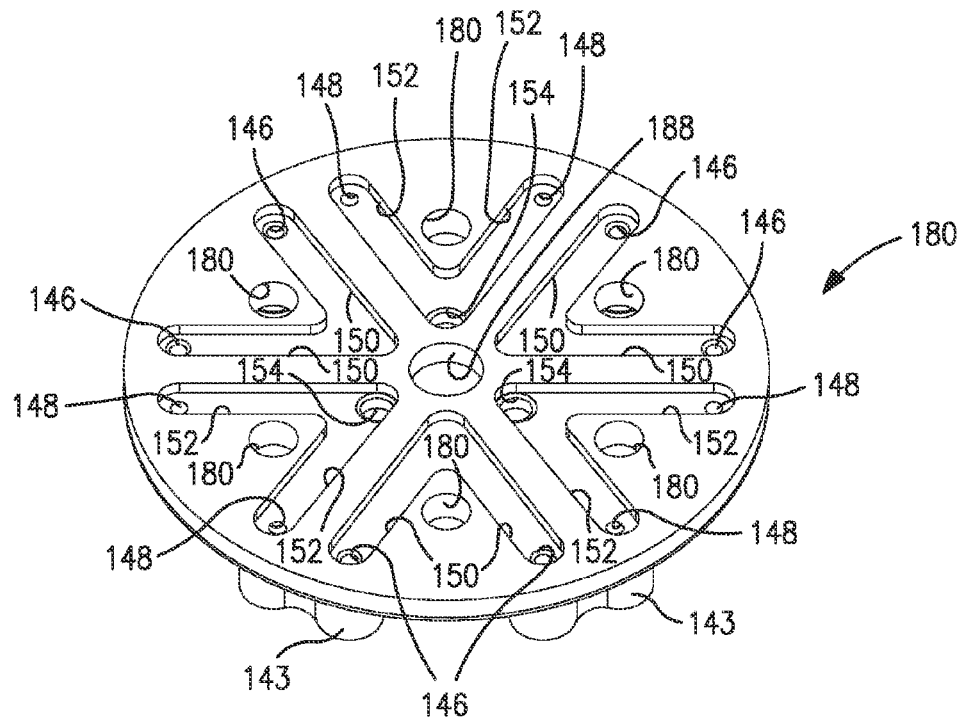
FIG. 9 is a top perspective view of a first plate used in the plate-like element shown in FIG. 8.

With additional reference to FIGS. 8 and 9, the plate-like element 138 consists of two sections formed of first and second plates 140 and 142 that are connected to one another in a juxtaposed relationship. The first plate 140 has raised bosses 143, each having circular grooves 144 to receive the ends of the inlet and outlet sections 134 and 136 of the oxygen transport membrane tubes 122. The ends of the inlet and outlet sections 134 and 136 are connected to the bosses 143 by glass or glass-ceramic seals such as baria-alumina-silcate glass seals. In this regard, both first and second plates 140 and 142 are fabricated from a ceramic having similar thermal expansion characteristics to the oxygen transport membrane tubes 122, for instance, 3YSZ or Mgo-MgAl2O4.

Pairs of axial bores 146 and 148 form inlet and outlet passages, respectively, to the inlet and outlet sections 134 and 136 of the oxygen transport membrane tubes 122. A radial arrangement of grooves 150 and 152 defined in the surface the first plate 140 form the inlet passages and the outlet passages, respectively. The grooves 150 and 152 are in communication with the bores 146 and 148 that form the inlet passages and the outlet passages to the inlet and outlet sections 134 and 136 of the oxygen transport membrane tubes 122. These elements act as inlet and outlet manifolds to the oxygen transport membrane tubes 122. When the second plate 142 is affixed to the first plate 140, the grooves 150 and 152 are covered by such plate and thereby form the inlet and outlet passages. The first and second plates 140 and 142 could be connected with a glass-ceramic seal of the type set forth above or co-fired with fugitive pore formers to form the grooves 150 and 152 or other internal manifold-like passages. Alternatively the manifold plates 140 and 142 could be formed from one monolithic block of ceramic. In a manner that will be discussed, the first plate 140 is provided with outlet openings 154 to the grooves 152 from which the heated combustion product stream is discharged to the central reactor tube 124. With brief reference to FIG. 7 and in a manner that also will be further discussed hereinafter, the hydrogen containing stream 34 is fed to the inlet passages 146 through inlet openings 156 defined in the second plate 142. The inlet openings 156 are in registry within the grooves 150 when the first plate 140 is affixed to the second plate 142. It is to be noted that although grooves 150 and 152 are provided with a chevron-like configuration, the segment making up such grooves could be segments that were not so connected. The disadvantage of this would be that there would have to be provided more inlet openings 156 and outlet openings 154.

Figure 10:
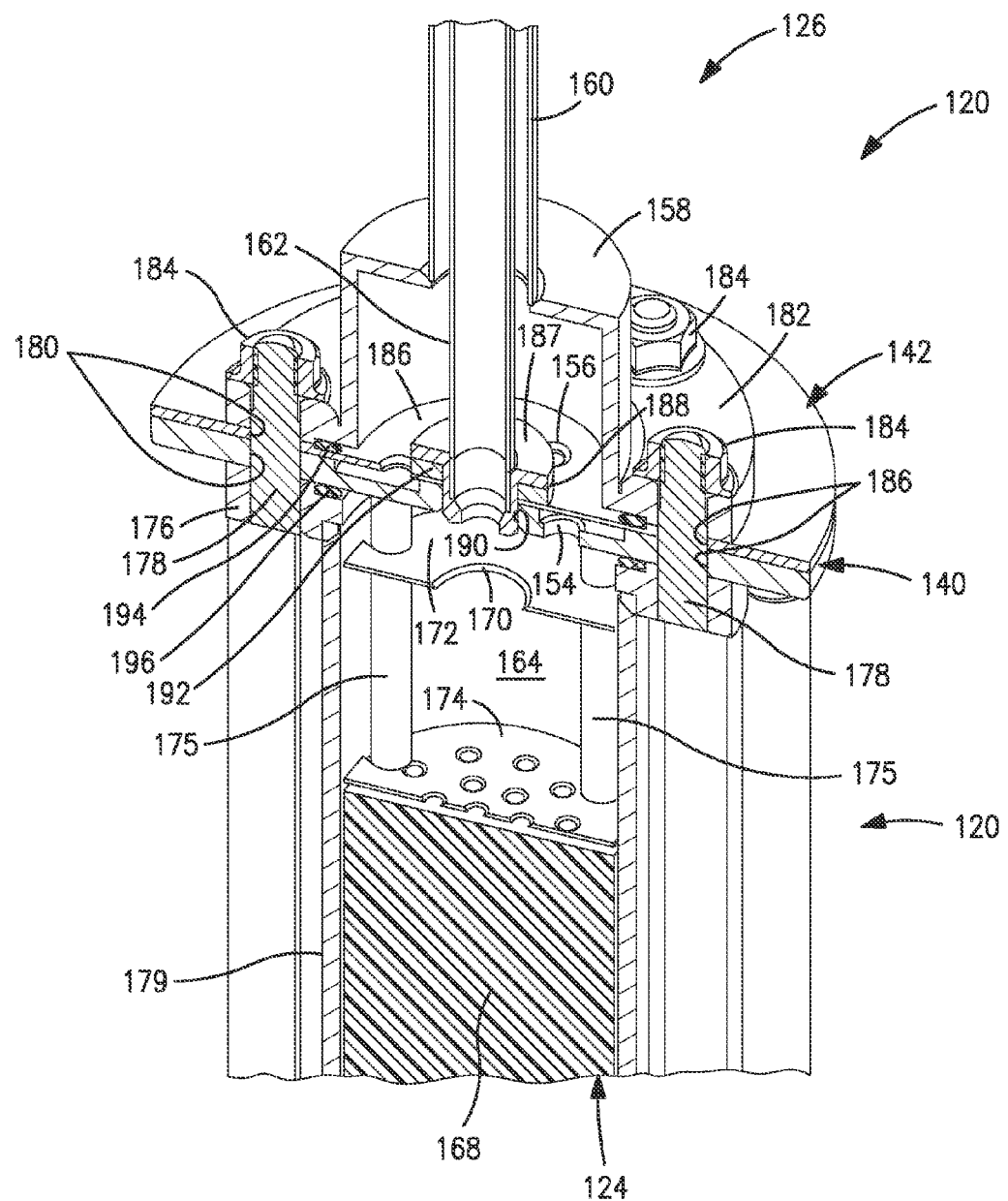
FIG. 10 is a fragmentary, perspective view of FIG. 6 with portions broken away to show internal features of the module of FIG. 6.

With reference to FIG. 10, the inlet assembly 126 has an inlet plenum 158 connected to the second plate 142 in a manner that will be discussed. An outer feed tube 160 is connected to the inlet plenum and the inlet 130 to feed the hydrogen containing stream 34 into the inlet plenum 158. The inlet plenum 158 is in communication with the inlet openings 156 in the second plate 142 to feed the hydrogen containing stream into the grooves 150 and therefore, into the inlet sections 134 of the oxygen transport membrane tubes 122. An inner feed tube 162 is coaxially positioned within the outer feed tube 160 and extends through the inlet plenum 158 to an inlet region 164 of the central reactor tube 124. The outlet openings 154 are in communication with an inlet region 164 of the central reactor tube 124 where the heated combustion product stream 36 from the oxygen transport membrane tubes 122 mixes with the reactant stream 38 to form the combined stream 40 that is fed to steam methane reforming catalyst 168 contained within the central reactor tube 124 to react and form the synthesis gas stream 42 that is discharged from the central reactor tube 162. Reforming catalyst 168 can be in the form of beads or honeycomb-like monoliths known in the art that are situated within a tubular portion 179 of the central reactor tube 124. Preferably, a restriction 170 in an internal plate 172 is positioned below the end of the inner feed tube 162 and a perforated plate 174 is located directly below the internal plate 172 to ensure mixing of the reactant stream 38 and the heated combustion product stream 36. Internal plate 172 is connected to perforated plate 174 by posts 175.

Central reactor tube 124 is provided with a flange 176 having threaded studs 178 that is connected to the tubular portion 179 of the central reactor tube 124 that contains the catalyst 168. The studs 178 pass through openings 180 within the first plate 140, the second plate 142 and a circular flange 182 connected to the plenum 158. Nuts 184 threaded onto the studs 178 hold the assembly in place. The inner feed tube 162 is connected to a nozzle 186 by a press fit and the nozzle 186 is in turn press fit through central openings 188 and 190 defined in first plate 140 and second plate 142, respectively. Nozzle 186 is provided with a shoulder 187 that compresses a washer-like seal 192 between shoulder 187 and first plate 140. Seal 192 can be formed of a ceramic felt that can be a blend of vermiculate and alumina. This arrangement of nozzle 186 and seal 192 thereby connects the inner feed tube 162 to the central reactor tube 124 in a gas-tight manner. Additionally, the flange 182 of the inlet plenum 158 is sealed to the second plate 142 in a gas tight manner by provision of a gas filled, ring-type seal 194 that is compressed between flange 182 and second plate 142. A similar gas filled, ring-type seal 196 is compressed between flange 178 of the central reactor tube 124 and the first plate 140 to seal the central reactor tube 124 to the first plate 140 in a gas tight manner It is to be noted that the outer feed tube 160, the inner feed tube 163 and the plenum 158 can all be formed from a chromium-containing metal, for instance, stainless steel or a nickel-based superalloy.

The tubular portion 179 of central reactor tube 124 is also preferably formed of a chromium-containing metal, for instance, stainless steel or nickel-based superalloy. In such case, a coating can be applied that serves as a barrier layer to prevent chromia migration and subsequent volatilization at the metal surface. These volatilized species will react with oxygen transport membrane tubes 122 and degrade performance. Such a coating could be a coating of a dense aluminum-oxide layer or spinel $((Mn_{0.5}Co_{0.5})_3O_4)$ provides both oxidation resistance and a chromia barrier at the surface. Alternatively, a high aluminum content alloy having more than 3 percent aluminum will form an aluminum oxide layer in a high-temperature atmosphere containing oxygen. Another possibility is to apply such a barrier coating in a known high temperature, gas phase diffusion process of nickel-allemande (Ni3Al). This creates a uniform, dense, and permanently metallically bonded layer on the surface of the metal. When in an oxidizing atmosphere at high temperature, a protective layer of aluminum oxide will form on the surface of the metal.

As mentioned above, the central reformer tube 124 is thermally coupled to the oxygen transport membrane tubes 122 through radiation heat exchange as a dominant mode. The emissivity of the reformer tube surface is an important factor in the efficiency of this coupling. Base metal, or aluminum-oxide coatings have a surface emissivity that are too low. Generally, coatings can be used to enhance emissivity at a surface. Therefore, in addition to the barrier layer coating, a stable, high temperature coating, preferably a cerium-oxide coating can also be applied to the tubular portion 179 of central reformer tube 124 that will provide high emissivity at the surface and also not react with the oxygen transport membrane tubes 122.

With reference to FIG. 11, an arrangement of modules 120 is shown that could be positioned within elongated, insulated reactor housing 110 shown in FIG. 3. Where catalytic reactors 3' are used, such as shown in FIG. 4, such catalytic reactor 3' could be in the form of tubes incorporating the coating discussed above and positioned between the reactor modules 120. The modules in FIG. 11 are arranged in such a way that the radiant heat transfer between the oxygen transport membrane tubes 122 and the central reformer tubes 124 is sufficient to provide the heat flux required by the endothermic reforming reactions occurring within the central reformer tube 124 accounting for the small amount of convective heat transfer that is occurring as well. In the configuration shown in FIG. 11, the view factor between each of the central reformer tubes 124 and all of the oxygen transport membrane tubes 122 that face each particular central reformer tube 124 and radiate heat thereto is preferably greater than or equal to 0.5. It is to be noted that even where modules are not employed and there exists an arrangement of oxygen transport membrane elements and catalytic reactors, the arrangement should preferably incorporate such view factor in order to employ the present invention in an industrial setting. If such view factor is not employed, then a resulting reactor in accordance with the present invention, while being able to manufacture a synthesis gas will, in all likelihood, not be able to produce the synthesis gas with a hydrogen to carbon monoxide ratio and methane slip suitable for a specific downstream process.

It is to be noted that the term "view factor" is the quantity known in the art that defines the fraction of the total energy leaving a surface that reaches another surface. The view factor is employed in an equation that is used to determine radiant heat transfer. This equation, well known in the art, is:

$$q_{12}=\epsilon\sigma A_2 F_{21}(T_1^4-T_2^4);$$

where $q_{12}$ is the radiant heat transfer between surface 1 and 2, $\epsilon$ is the emissivity, $\sigma$ is Stefan Boltzmann constant, $A_2$ is the area of surface 2, $F_{21}$ is the view factor from surface 2 to surface 1, $T_1$ is the absolute temperature of surface 1 and $T_2$ is the absolute temperature of surface 2.

While the present invention has been described in relation to preferred embodiments, as will occur to those skilled in the art, numerous, additions, changes and modifications thereto can be made without departing from the spirit and scope of the present invention as set forth in the appended claims.

We claim:

1. A method for producing a synthesis gas product comprising:
   contacting permeate and retentate sides of at least one oxygen transport membrane element configured to separate oxygen through oxygen ion transport with a hydrogen containing stream formed from a synthesis gas containing no more than 20 percent methane by volume and an oxygen containing stream, respectively;
   reacting the hydrogen containing stream with the oxygen transported through the at least one oxygen transport membrane element, thereby generating heat, a heated reaction product stream and a heated retentate stream;
   combining the heated reaction product stream with a reactant stream to form a combined stream comprising hydrocarbons contributed by the reactant stream and steam contributed at least by the heated reaction product stream;
   reacting the hydrocarbons and steam contained in the combined stream in at least one catalytic reactor to produce a synthesis gas stream;
   transferring the heat generated by the at least one oxygen transport membrane element to the at least one catalytic reactor by radiation from the at least one oxygen transport membrane element and by indirect heat transfer from the heated retentate stream to the at least one catalytic reactor to assist in supporting endothermic heating requirements of the steam methane reforming reaction; and
   producing the synthesis gas product from at least part of the synthesis gas stream.

2. The method of claim 1, wherein a supplementary steam stream is introduced into at least one of the hydrogen containing stream and the reactant stream.

3. The method of claim 1, wherein a carbon dioxide stream is introduced into at least one of the heated reaction product stream, the reactant stream, the hydrogen containing stream and the combined stream.

4. The method of claim 1, wherein the oxygen containing stream is preheated through indirect heat exchange with the heated retentate stream prior to being introduced to the retentate side of the at least one oxygen transport membrane.

5. The method of claim 1, wherein the synthesis gas stream is divided such that the synthesis gas product is formed from the part of the synthesis gas stream and the hydrogen containing stream is formed from another part of the synthesis gas stream that is recycled to the permeate side of the at least one oxygen transport membrane element.

6. The method of claim 5, wherein the synthesis gas stream is cooled at least in part by adding water or steam into the synthesis gas stream prior to dividing the synthesis gas stream.

7. The method of claim 6, wherein a supplementary steam stream is introduced into at least one of the hydrogen containing stream and the reactant stream.

8. The method of claim 1 or claim 4, wherein:
   the at least one catalytic reactor has a polishing section heated by an auxiliary burner fired by a fuel thereby increasing equilibrium temperature at the outlet of the at least one catalytic reactor and reducing methane slip from the at least one catalytic reactor; and
   the heated retentate supports combustion of the fuel within the auxiliary burner prior to preheating the oxygen containing stream.

9. The method of claim 1, wherein:
   the at least one catalytic reactor is at least one first catalytic reactor; and
   the hydrogen containing stream is formed, at least in part, by reacting additional hydrocarbons and the further steam in the at least one second catalytic reactor.

10. The method of claim 9, wherein the heat is also transferred to the at least one second catalytic reactor by radiation and indirect heat transfer from the heated retentate stream to supply the endothermic heating requirements for the reaction of the additional hydrocarbons and further steam.

* * * * *